UNITED STATES PATENT OFFICE.

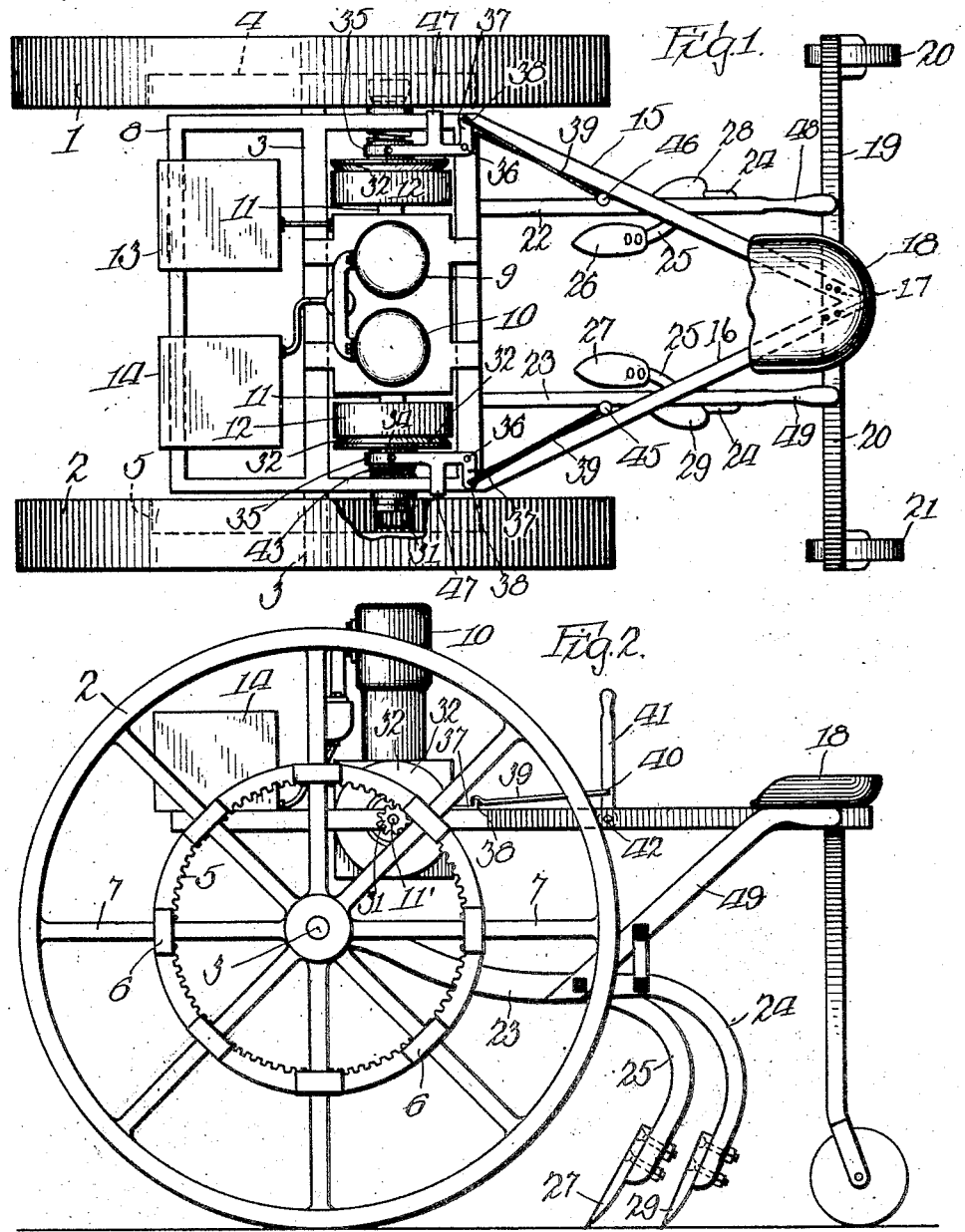

LOUIS JACOBS, OF STEVENS POINT, WISCONSIN.

SELF-PROPELLING CULTIVATOR.

1,322,306. Specification of Letters Patent. Patented Nov. 18, 1919.

Application filed March 28, 1918. Serial No. 225,207.

*To all whom it may concern:*

Be it known that I, LOUIS JACOBS, a citizen of the United States, residing at Stevens Point, Portage county, Wisconsin, have invented certain new and useful Improvements in Self-Propelling Cultivators, of which the following is a specification.

My invention relates to farming implements and machinery and has particular reference to a "horseless" cultivator and the provisions in connection therewith for carrying the driving power on the cultivator and for simply and promptly making the short turns at the ends of rows that this form of implement usually must make. This invention consists in the novel construction, combination and arrangement of parts, all as hereinafter described in detail, illustrated in the accompanying drawing, and more particularly pointed out in the appended claim.

In the drawing—

Figure 1 is a plan view, partly broken away, of a cultivator embodying my invention.

Fig. 2 is a side elevation.

Fig. 3 is an enlarged horizontal section on an enlarged scale of the motor driving shaft clutch mechanism connection for each of the driving wheels.

In the several views 1 and 2 are the wheels of the cultivator carried in the usual axle 3 on which axle are also pivoted for the usual vertical and horizontal pivotal movements the cultivator shovel beams, details of said axle connection not shown in this connection. To the inner sides of the wheels are secured internal gear-rings 4 and 5. These may be secured to the wheels in any suitable manner, as, for instance, by clamps or brackets 6, 6 that clamp the gear rings to spokes 7 of the wheels. On the axle 3 is mounted a frame 8 that carries any suitable type of internal explosion engine. In the present instance the driving power is represented by a pair of engine-cylinders 9 and 10 that are connected in the well known manner with a crank shaft 11 each end of which is reduced to provide a clutch mechanism carrying spindle or shaft portion 11'. At the opposite ends of said driving shaft and secured to the latter or made a part thereof are fly wheels constructed and arranged to serve as clutch members. One of these identical fly wheels is shown in section in Fig. 3 and is designated by the numeral 12. 13 represents the radiator tank and 14 the fuel tank for the engine, both being connected in the usual manner not shown in detail.

From opposite sides of the frame 8 extend toward each other seat-carrying arms 15 and 16 which form an angle over which is mounted a seat 18 and to which is secured by means of bolts or rivets 17 an arch-form supporting bar 19 on the ends of which are casters or wheels 20 and 21. The latter carry the weight of the driver and may be arranged in any suitable manner to clear rows of vegetation to be cultivated. On the axle 3 are mounted in any well known manner the usual beams 22 and 23 which are generally provided with branches 24 and 25 on the lower ends of which are shovels 26, 27, 28, and 29. On each of the reduced portions 11' of the driving shaft 11 is loosely mounted a sleeve 30 to one end of which is keyed a pinion 31 that is in mesh with the driving wheel internal gear ring. On the opposite end of said sleeve is splined for longitudinal movement thereon a movable clutch-member 32 which has thereon a hub 33 with a peripheral groove 34 therein that is engaged by a ring 34' that is loose in its groove and has pivoted thereto in the well known manner the arms of a fork 35 of a clutch-member operating lever 35 that is of elbow form and has its angle portion fulcrumed at 36 to any suitable stationary part. The end or arm of this lever to which the force is applied from the operator's lever is distinguished from its fork-portion 35 by the numeral 37. To the arm 37 is connected at 38 a rod 39 that is pivoted at 40 to a hand-lever 41 which operates the clutch for the wheel 2. The lever 41 is fulcrumed at 42. The movable clutch member 32 is of conical form and is normally held in engagement with the correspondingly hollowed out fly wheel which is the engine driving shaft clutch member, by means of a coiled spring 43 interposed between a flange 44 on the sleeve 30, between which and another somewhat similar flange 45 a frame portion is engaged to prevent longitudinal movement of said sleeve. The operator's lever for the wheel 1 is designated by the numeral 46 and is connected in the same manner as the lever 41 is connected with the clutch mechanism for the wheel 2 as described above. On the forked end 35 of each clutch elbow lever is a projection or lug 47 which serves as a brake shoe and is brought into contact with the internal gear ring to apply a brake to the wheel when the movable clutch member has been moved out of engagement with the engine shaft clutch member. By swinging the elbow lever in its release movement sufficiently to apply the brake shoe or lug with force enough to entirely stop rotation of the wheel the stopped wheel may serve as a pivot around which the other wheel moves in making a short turn. To the shovel beams are secured the usual plow handles by means of which the operator from his seat is enabled to control the shovel beams which may also be controlled by the feet of the operator when his hands are otherwise engaged.

I claim as my invention—

The combination with a pair of combination driving and steering wheels and an axle upon which they are mounted, of an engine mounted over said axle, a driving shaft for said engine, a separate clutch mechanism adapted to connect each end of said shaft separately with each driving wheel, a lever and operating connections for each clutch, a brake mechanism connected with each of said clutches and levers and operable simultaneously therewith to apply the brake to a wheel after the clutch mechanism therefor has been released from the engine shaft and swiveled wheels upon which a driver is supported in the rear of said driving and steering wheels.

In testimony whereof I have hereunto signed my name.

LOUIS JACOBS.